(12) United States Patent
Sobanski et al.

(10) Patent No.: US 11,022,307 B2
(45) Date of Patent: Jun. 1, 2021

(54) GAS TURBINE COMBUSTOR HEAT SHIELD PANEL HAVING MULTI-DIRECTION HOLE FOR RAIL EFFUSION COOLING

(71) Applicant: UNITED TECHNOLOGIES CORPORATION, Farmington, CT (US)

(72) Inventors: Jon E Sobanski, Glastonbury, CT (US); Steven D Porter, Wethersfield, CT (US)

(73) Assignee: Raytheon Technology Corporation, Farmington, CT (US)

( * ) Notice: Subject to any disclaimer, the term of this patent is extended or adjusted under 35 U.S.C. 154(b) by 163 days.

(21) Appl. No.: 15/902,171

(22) Filed: Feb. 22, 2018

(65) Prior Publication Data

US 2019/0257248 A1    Aug. 22, 2019

(51) Int. Cl.
*F23R 3/00*    (2006.01)
*F23R 3/06*    (2006.01)
(Continued)

(52) U.S. Cl.
CPC .............. *F23R 3/06* (2013.01); *F02C 7/18* (2013.01); *F23R 3/002* (2013.01); *F23R 3/50* (2013.01); *F23R 3/007* (2013.01)

(58) Field of Classification Search
CPC .... F23R 3/50; F23R 3/002; F23R 3/04; F23R 3/045; F23R 3/06; F23R 3/007;
(Continued)

(56) References Cited

U.S. PATENT DOCUMENTS 4,158,949 A * 6/1979 Reider
4,242,871 A * 1/1981 Breton .................... F23R 3/08
                                                    60/757
(Continued)

FOREIGN PATENT DOCUMENTS

DE    102007000516    5/2008
EP         1503144    2/2005
(Continued)

OTHER PUBLICATIONS

USPTO, Pre-Interview First Office Action dated Feb. 25, 2020 in U.S. Appl. No. 15/889,816.
(Continued)

*Primary Examiner* — William H Rodriguez
(74) *Attorney, Agent, or Firm* — Snell & Wilmer L.L.P.

(57) ABSTRACT

A heat shield panel for use in a gas turbine engine combustor is disclosed. In various embodiments, the heat shield panel includes a hot side, a cold side spaced from the hot side, a rail member disposed on the cold side proximate an outer perimeter, the rail member having an outer wall and an inner wall and an orifice extending through the rail member, from the inner wall to the outer wall, the orifice having an entrance portion having an entrance opening positioned on the inner wall and extending at least to an intermediate portion of the rail member and an exit portion having an exit opening positioned on the outer wall and extending at least to the intermediate portion of the rail member, the entrance portion of the orifice being angled relative to the exit portion of the orifice.

9 Claims, 10 Drawing Sheets

(51) Int. Cl.
*F02C 7/18* (2006.01)
*F23R 3/50* (2006.01)

(58) Field of Classification Search
CPC .. F23R 2900/00018; F23R 2900/03041; F23R 2900/03042; F23R 2900/03043; F23R 2900/03044; F05D 2260/201; F05D 2240/35; F05D 2240/15; F05D 2230/30; F05D 2230/10
See application file for complete search history.

(56) References Cited

U.S. PATENT DOCUMENTS

| | | | |
|---|---|---|---|
| 5,079,915 A | 1/1992 | Veau | |
| 5,419,681 A | 5/1995 | Lee | |
| 6,029,455 A | 2/2000 | Sandelis | |
| 6,606,861 B2 | 8/2003 | Snyder | |
| 6,810,673 B2 | 11/2004 | Snyder | |
| 7,812,282 B2 | 10/2010 | Kuhn et al. | |
| 8,291,709 B2 | 10/2012 | Kombowski et al. | |
| 9,429,323 B2 | 8/2016 | Richardson | |
| 9,518,739 B2* | 12/2016 | Hu | F23R 3/04 |
| 9,555,470 B1 | 1/2017 | Heneveld et al. | |
| 9,752,447 B2 | 9/2017 | Clum et al. | |
| 2001/0005555 A1* | 6/2001 | Kreis | F01D 11/12 428/596 |
| 2002/0124572 A1* | 9/2002 | Pidcock | F23R 3/002 60/796 |
| 2004/0146399 A1* | 7/2004 | Bolms | F01D 25/12 415/175 |
| 2006/0037323 A1 | 2/2006 | Reynolds | |
| 2006/0059916 A1* | 3/2006 | Cheung | F23R 3/00 60/752 |
| 2007/0245742 A1 | 10/2007 | Dahlke | |
| 2007/0283700 A1* | 12/2007 | Gerendas | F23R 3/002 60/754 |
| 2008/0271457 A1* | 11/2008 | McMasters | F23R 3/002 60/754 |
| 2009/0077974 A1* | 3/2009 | Dahlke | F23M 5/085 60/752 |
| 2009/0199837 A1* | 8/2009 | Tschirren | F23R 3/002 126/144 |
| 2010/0095679 A1* | 4/2010 | Rudrapatna | F23R 3/005 60/752 |
| 2011/0197590 A1* | 8/2011 | Bottcher | F23R 3/002 60/752 |
| 2012/0272652 A1* | 11/2012 | Nicholls | F23R 3/10 60/740 |
| 2014/0096528 A1 | 4/2014 | Cunha et al. | |
| 2014/0238030 A1 | 8/2014 | Gerendas | |
| 2014/0290258 A1 | 10/2014 | Gerendas et al. | |
| 2015/0027127 A1* | 1/2015 | Clemen | F23R 3/06 60/752 |
| 2015/0292741 A1 | 10/2015 | Cunha et al. | |
| 2015/0354818 A1* | 12/2015 | Lebel | F02C 7/28 60/796 |
| 2015/0377033 A1 | 12/2015 | Xu | |
| 2016/0003056 A1* | 1/2016 | Xu | B22C 9/10 416/97 R |
| 2016/0054001 A1* | 2/2016 | Bangerter | F23R 3/007 60/772 |
| 2016/0097285 A1* | 4/2016 | Harding | F01D 5/186 60/752 |
| 2016/0097325 A1* | 4/2016 | Harding | F23R 3/06 60/752 |
| 2016/0102860 A1* | 4/2016 | Chandler | F23R 3/60 60/754 |
| 2016/0177758 A1 | 6/2016 | Clum et al. | |
| 2016/0193667 A1* | 7/2016 | Luketic | F23R 3/002 29/558 |
| 2016/0208704 A1* | 7/2016 | Bouldin | F02C 7/18 |
| 2016/0230996 A1* | 8/2016 | Kostka | F23M 5/04 |
| 2016/0238253 A1* | 8/2016 | Moura | F23R 3/06 |
| 2016/0245094 A1* | 8/2016 | Bunker | F02C 7/18 |
| 2016/0252249 A1* | 9/2016 | Erbas-Sen | F23R 3/06 60/752 |
| 2016/0258626 A1* | 9/2016 | Moura | F23R 3/007 |
| 2016/0265775 A1* | 9/2016 | Cunha | F23M 5/08 |
| 2016/0273363 A1* | 9/2016 | Bunker | F23R 3/06 |
| 2016/0273772 A1* | 9/2016 | Cunha | F23R 3/005 |
| 2016/0305325 A1* | 10/2016 | Cunha | F02C 7/18 |
| 2016/0377289 A1* | 12/2016 | Kostka, Jr. | F23R 3/04 60/752 |
| 2017/0009987 A1* | 1/2017 | McKinney | F02C 7/24 |
| 2017/0114798 A1 | 4/2017 | Spangler | |
| 2017/0205069 A1* | 7/2017 | Tentorio | F23R 3/007 |
| 2017/0227220 A1 | 8/2017 | Schilp et al. | |
| 2017/0241643 A1* | 8/2017 | Mulcaire | F23R 3/002 |
| 2017/0276356 A1* | 9/2017 | Mulcaire | F23R 3/28 |
| 2017/0298743 A1 | 10/2017 | Webster | |
| 2017/0356653 A1* | 12/2017 | Bagchi | F23R 3/007 |
| 2018/0073736 A1* | 3/2018 | Papple | F23R 3/10 |
| 2018/0238545 A1* | 8/2018 | Quach | F23R 3/50 |
| 2018/0238547 A1* | 8/2018 | Quach | F23R 3/50 |
| 2018/0335212 A1* | 11/2018 | Quach | F23R 3/002 |
| 2019/0242580 A1* | 8/2019 | Porter | F23R 3/16 |
| 2019/0257206 A1* | 8/2019 | Webster | F01D 5/187 |
| 2019/0285276 A1* | 9/2019 | Porter | F23R 3/002 |
| 2020/0033003 A1* | 1/2020 | Gerendas | F23R 3/002 |
| 2020/0041126 A1* | 2/2020 | Anderson | F23R 3/04 |

FOREIGN PATENT DOCUMENTS

| | | |
|---|---|---|
| EP | 2012531 | 4/2016 |
| EP | 3088100 | 11/2016 |
| EP | 3112755 | 1/2017 |
| EP | 3183497 | 6/2017 |
| GB | 2317005 | 3/1998 |
| WO | 2008017551 | 2/2008 |
| WO | 2014169127 | 10/2014 |
| WO | 2015108584 | 7/2015 |
| WO | 2015112220 | 7/2015 |
| WO | 2015112221 | 7/2015 |

OTHER PUBLICATIONS

European Patent Office, European Search Report dated Sep. 16, 2019 in Application No. 19154249.7.
USPTO, Restriction/Election Requirement dated Oct. 24, 2019 in U.S. Appl. No. 15/889,793.
USPTO, Restriction/Election Requirement dated Dec. 12, 2019 in U.S. Appl. No. 15/889,764.
USPTO, Restriction/Election Requirement dated Dec. 13, 2019 in U.S. Appl. No. 15/889,816.
USPTO, Non-Final Office Action dated Jan. 21, 2020 in U.S. Appl. No. 15/889,793.
USPTO, Porter et al, U.S. Appl. No. 15/889,764, filed Feb. 6, 2018 and entitled Pull-Plane Effusion Combustor Panel.
USPTO, Porter et al, U.S. Appl. No. 15/889,793, filed Feb. 6, 2018 and entitled Undercut Combustor Panel Rail.
USPTO, Sobanski et al, U.S. Appl. No. 15/889,816 filed Feb. 6, 2018 and entitled Diffusing Hole Rail Effusion.
European Patent Office, European Search Report dated Jun. 13, 2019 in Application No. 19154249.7.
European Patent Office, European Search Report dated Mar. 6, 2019 in Application No. 19154252.1.
European Patent Office, European Search Report dated Mar. 21, 2019 in Application No. 19155472.4.
European Patent Office, European Search Report dated Apr. 3, 2019 in Application No. 19156740.3.
European Patent Office, European Office Action dated Jun. 19, 2020 in Application No. 19154249.7.
USPTO, First Action Interview Office Action dated Jun. 16, 2020 in U.S. Appl. No. 15/889,816.
USPTO, Final Office Action dated Jun. 25, 2020 in U.S. Appl. No. 15/889,793.
USPTO, First Action Interview Office Action dated Aug. 5, 2020 in U.S. Appl. No. 15/889,764.

(56) References Cited

OTHER PUBLICATIONS

USPTO, Notice of Allowance dated Aug. 25, 2020 in U.S. Appl. No. 15/889,816.
USPTO, Advisory Action dated Aug. 31, 2020 in U.S. Appl. No. 15/889,793.
USPTO, Pre-Interview First Office Action dated Apr. 14, 2020 in U.S. Appl. No. 15/889,764.
USPTO, Final Office Action dated Nov. 27, 2020 in U.S. Appl. No. 15/889,764.
USPTO, Notice of Allowance dated Jan. 22, 2021 in U.S. Appl. No. 15/889,793.

* cited by examiner

GAS TURBINE COMBUSTOR HEAT SHIELD PANEL HAVING MULTI-DIRECTION HOLE FOR RAIL EFFUSION COOLING

FIELD

The present disclosure relates to gas turbine engines and, more particularly, to effusion panels used in the combustors of gas turbine engines.

BACKGROUND

Gas turbine engines, such as those that power modern commercial and military aircraft, include a fan section to propel the aircraft, a compressor section to pressurize a supply of air from the fan section, a combustor section to burn a hydrocarbon fuel in the presence of the pressurized air, and a turbine section to extract energy from the resultant combustion gases and generate thrust.

The combustor section typically includes a bulkhead assembly, an inner liner assembly and an outer liner assembly. The bulkhead assembly extends radially between the inner liner assembly and the outer liner assembly to define a combustion chamber. Each liner assembly can be formed from one or more panels and one or more shells. Cooling cavities reside between the panels and the shells. The cooling cavities fluidly couple impingement apertures defined in the shells with effusion apertures defined in the panels.

SUMMARY

A heat shield panel for use in a gas turbine engine combustor is disclosed. In various embodiments, the heat shield panel includes a hot side and a cold side spaced from the hot side, a rail member disposed on the cold side proximate an outer perimeter, the rail member having an outer wall and an inner wall and an orifice extending through the rail member, from the inner wall to the outer wall, the orifice having an entrance portion having an entrance opening positioned on the inner wall and extending at least to an intermediate portion of the rail member and an exit portion having an exit opening positioned on the outer wall and extending at least to the intermediate portion of the rail member, with the entrance portion of the orifice angled relative to the exit portion of the orifice.

In various embodiments, the entrance portion and the exit portion intersect at a cross sectional plane located proximate the intermediate portion. In various embodiments, the exit opening is positioned to direct a flow of air through the orifice toward an engine component positioned adjacent the rail member. In various embodiments, the engine component is a second heat shield panel positioned adjacent the rail member.

In various embodiments, the cross sectional plane includes at least a portion disposed closer in distance to the hot side than both the entrance opening and the exit opening. In various embodiments, the cross sectional plane includes a least a portion disposed closer in distance to the hot side than the exit opening and the cross sectional plane and the entrance opening are positioned substantially the same distance from the hot side. In various embodiments, the entrance portion and the exit portion include substantially circular cross sections and the cross sectional plane is substantially oval in cross section. In various embodiments, the outer perimeter has a rectangular shape and the hot side and the cold side have an arcuate shape. In various embodiments, the rail member extends entirely about the rectangular shape of the outer perimeter.

A heat shield panel for use in a gas turbine engine combustor is disclosed. In various embodiments, the heat shield panel includes a base member having a hot side surface and a cold side surface and an outer perimeter, a rail member disposed on the cold side surface of the base member proximate a first portion of the outer perimeter, the rail member having an outer wall and an inner wall and an orifice extending through the rail member, from the inner wall to the outer wall, the orifice having a first intersecting hole extending from an entrance opening positioned on the inner wall to a first exit opening positioned proximate the outer wall and a second intersecting hole extending from a second exit opening positioned on the outer wall to a third exit opening positioned on the hot side surface. In various embodiments, the first intersecting hole and the second intersecting hole intersect proximate an intermediate portion positioned intermediate the inner wall and the outer wall.

In various embodiments, the heat shield panel includes a first plug extending from the first exit opening to the intermediate portion and configured to allow a flow of cooling air to enter the entrance opening and to exit both the second exit opening and the third exit opening. In various embodiments, the heat shield panel includes a first plug extending from the first exit opening to the intermediate portion and a second plug extending from the third exit opening to the intermediate portion, the first plug and the second plug configured to allow a flow of cooling air to enter the entrance opening and exit the second exit opening. In various embodiments, the first plug comprises at least one of a braze and a weld. In various embodiments, the second plug comprises at least one of a braze and a weld. In various embodiments, the second exit opening is oriented with respect to the intermediate portion to direct an impingement flow toward a second heat shield panel.

A method of forming an orifice through a rail member of a heat shield panel having a cold side surface and a hot side surface is disclosed. In various embodiments, the method includes the steps of positioning the rail member and a hole boring tool at a first orientation, where the hole boring tool is at a first predetermined angle relative to the cold side surface, forming a first hole into the rail member using the hole boring tool, the first hole extending at least partially through the rail member, positioning the rail member and the hole boring tool at a second orientation, where the hole boring tool is at a second predetermined angle relative to the cold side surface, forming a second hole into the rail member using the hole boring tool, the second hole extending at least partially through the rail member and intersecting a portion of the first hole, where the first hole and the second hole form the orifice extending through the rail member, from an inner wall of the rail member to an outer wall of the rail member.

In various embodiments, at least one of the first hole and the second hole extends through the rail member. In various embodiments, the method further includes the step of plugging a portion of the at least one of the first hole and the second hole. In various embodiments, both the first hole and the second hole extend through the rail member. In various embodiments, the method includes plugging a portion of at least one of the first hole and the second hole.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
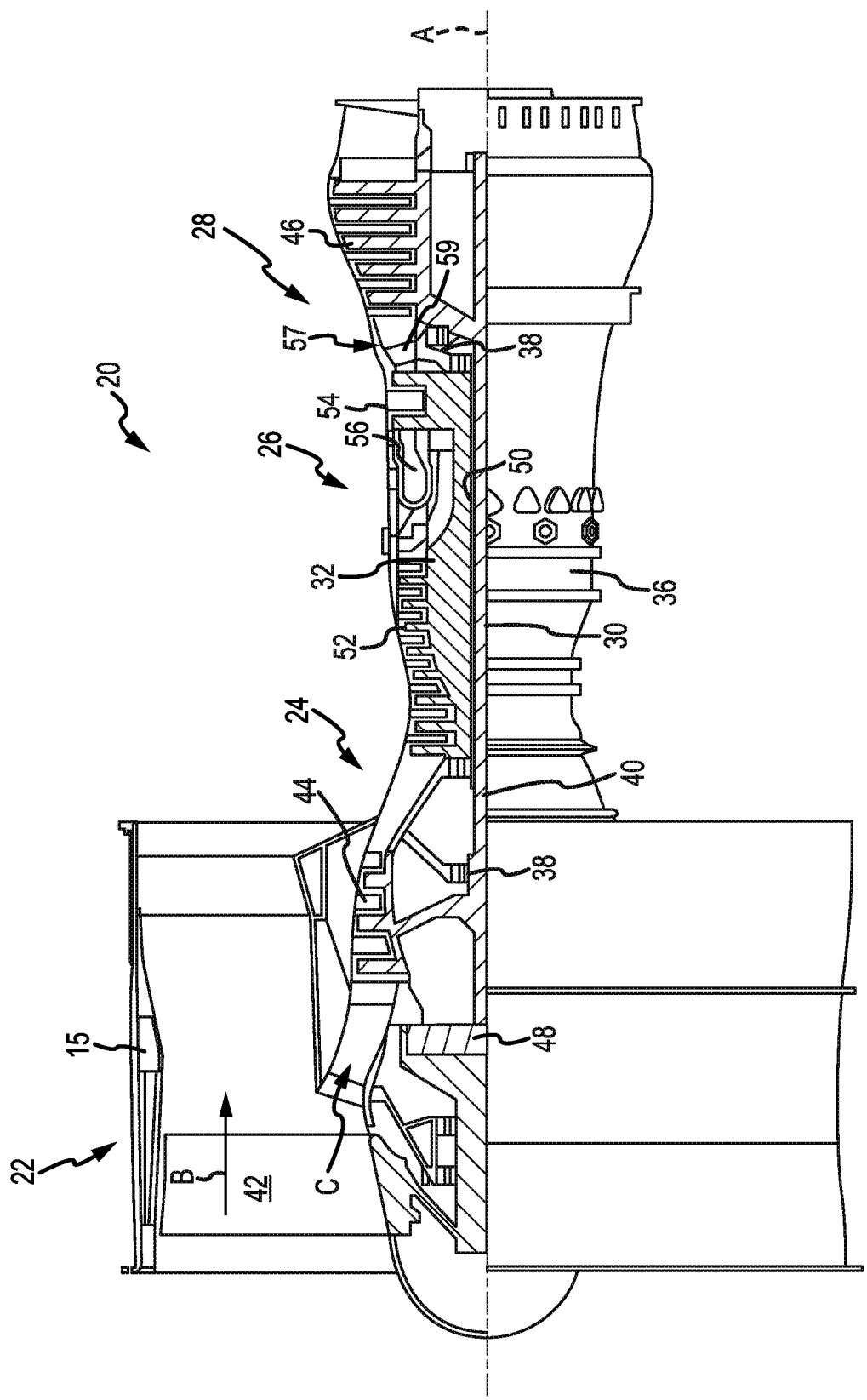
FIG. 1A is a cross sectional schematic view of a gas turbine engine, in accordance with various embodiments.

Referring now to the drawings, FIG. 1A schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a primary or core flow path C for compression and communication into the combustor section 26 and then expansion through the turbine section 28. Although depicted as a two-spool turbofan gas turbine engine in the disclosed non-limiting embodiment, it will be understood that the concepts described herein are not limited to use with two-spool turbofans as the teachings may be applied to other types of turbine engines, including three-spool architectures.

The gas turbine engine 20 generally includes a low speed spool 30 and a high speed spool 32 mounted for rotation about an engine central longitudinal axis A relative to an engine static structure 36 via several bearing systems 38. It should be understood that various bearing systems at various locations may alternatively or additionally be provided and the location of the several bearing systems 38 may be varied as appropriate to the application. The low speed spool 30 generally includes an inner shaft 40 that interconnects a fan 42, a low pressure compressor 44 and a low pressure turbine 46. The inner shaft 40 is connected to the fan 42 through a speed change mechanism, which in this gas turbine engine 20 is illustrated as a fan drive gear system 48 configured to drive the fan 42 at a lower speed than the low speed spool 30. The high speed spool 32 includes an outer shaft 50 that interconnects a high pressure compressor 52 and a high pressure turbine 54. A combustor 56 is arranged in the gas turbine engine 20 between the high pressure compressor 52 and the high pressure turbine 54. A mid-turbine frame 57 of the engine static structure 36 is arranged generally between the high pressure turbine 54 and the low pressure turbine 46 and may include airfoils 59 in the core flow path C for guiding the flow into the low pressure turbine 46. The mid-turbine frame 57 further supports the several bearing systems 38 in the turbine section 28. The inner shaft 40 and the outer shaft 50 are concentric and rotate via the several bearing systems 38 about the engine central longitudinal axis A, which is collinear with their longitudinal axes.

The air in the core flow path is compressed by the low pressure compressor 44 and then the high pressure compressor 52, mixed and burned with fuel in the combustor 56, and then expanded over the high pressure turbine 54 and low pressure turbine 46. The low pressure turbine 46 and the high pressure turbine 54 rotationally drive the respective low speed spool 30 and the high speed spool 32 in response to the expansion. It will be appreciated that each of the positions of the fan section 22, the compressor section 24, the combustor section 26, the turbine section 28, and the fan drive gear system 48 may be varied. For example, the fan drive gear system 48 may be located aft of the combustor section 26 or even aft of the turbine section 28, and the fan section 22 may be positioned forward or aft of the location of the fan drive gear system 48.

Figure 1B:
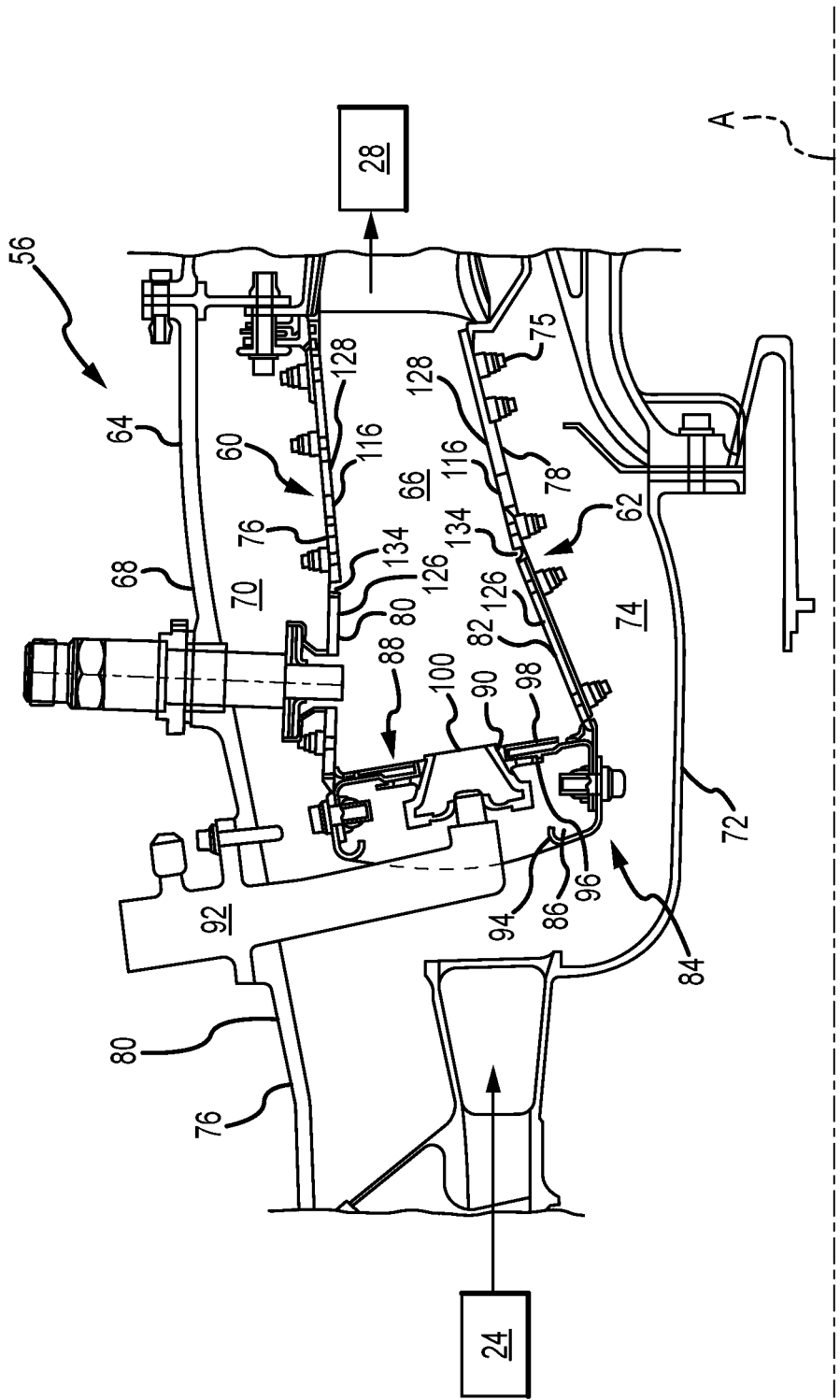
FIG. 1B is a cross sectional schematic view of a combustor section of a gas turbine engine, in accordance with various embodiments.

Referring to FIG. 1B, the combustor 56 may generally include an outer liner assembly 60, an inner liner assembly 62 and a diffuser case module 64 that surrounds the outer liner assembly 60 and the inner liner assembly 62. A combustion chamber 66, positioned within the combustor 56, has a generally annular configuration, defined by and comprising the outer liner assembly 60, the inner liner assembly 62 and a bulkhead liner assembly 88. The outer liner assembly 60 and the inner liner assembly 62 are generally cylindrical and radially spaced apart, with the bulkhead liner assembly 88 positioned generally at a forward end of the combustion chamber 66. The outer liner assembly 60 is spaced radially inward from an outer diffuser case 68 of the diffuser case module 64 to define an outer annular plenum 70. The inner liner assembly 62 is spaced radially outward from an inner diffuser case 72 of the diffuser case module 64 to define, in-part, an inner annular plenum 74. Although a particular combustor is illustrated, it should be understood that other combustor types with various combustor liner arrangements will also benefit from this disclosure. It should be further understood that the disclosed cooling flow paths are but an illustrated embodiment.

The combustion chamber 66 contains the combustion products that flow axially toward the turbine section 28. The outer liner assembly 60 includes an outer support shell 76 and the inner liner assembly 62 includes an inner support shell 78. The outer support shell 76 supports one or more outer panels 80 and the inner support shell 78 supports one or more inner panels 82. Each of the outer panels 80 and the inner panels 82 may be formed of a plurality of floating panels that are generally rectilinear and manufactured from, for example, a nickel based super alloy that may be coated with a ceramic or other temperature resistant material, and are arranged to form a panel configuration mounted to the respective outer support shell 76 and inner support shell 78. In various embodiments, the combination of the outer support shell 76 and the outer panels 80 is referred to an outer heat shield or outer heat shield liner, while the combination of the inner support shell 78 and the inner panels 82 is referred to as an inner heat shield or inner heat shield liner. In various embodiments, the panels are secured to the shells via one or more attachment mechanisms 75, which may each comprise a threaded stud and nut assembly.

The combustor 56 further includes a forward assembly 84 that receives compressed airflow from the compressor section 24 located immediately upstream. The forward assembly 84 generally includes an annular hood 86, a bulkhead liner assembly 88, and a plurality of swirlers 90 (one shown). Each of the swirlers 90 is aligned with a respective one of a plurality of fuel nozzles 92 (one shown) and a respective one of a plurality of hood ports 94 (one shown) to project through the bulkhead liner assembly 88; generally, the pluralities of swirlers 90, fuel nozzles 92 and hood ports 94 are circumferentially distributed about the annular hood 86 and the bulkhead liner assembly 88. The bulkhead liner assembly 88 includes a bulkhead support shell 96 secured to the outer liner assembly 60 and to the inner liner assembly 62 and a plurality of bulkhead panels 98 secured to the bulkhead support shell 96; generally, the bulkhead panels 98 are circumferentially distributed about the bulkhead liner assembly 88. The bulkhead support shell 96 is generally annular and the plurality of bulkhead panels 98 is segmented, typically one panel to each of the fuel nozzles 92 and swirlers 90. The annular hood 86 extends radially between, and is secured to, the forward-most ends of the outer liner assembly 60 and the inner liner assembly 62. Each of the hood ports 94 receives a respective one of the plurality of fuel nozzles 92 and facilitates the direction of compressed air into the forward end of the combustion chamber 66 through a respective one of a plurality of swirler openings 100. Each of the fuel nozzles 92 may be secured to the diffuser case module 64 and project through a respective one of the hood ports 94 and into a respective one of the swirlers 90.

The forward assembly 84 introduces core compressed air into the forward section of the combustion chamber 66 while the remainder of the compressed air enters the outer annular plenum 70 and the inner annular plenum 74. The plurality of fuel nozzles 92 and adjacent structure generate a blended fuel-air mixture that supports stable combustion in the combustion chamber 66. Air in the outer annular plenum 70 and the inner annular plenum is also introduced into the combustion chamber 66 via a plurality of orifices 116, which may include dilution holes or air feed holes of various dimension. The outer support shell 76 may also include a plurality of impingement holes (discussed further below) that introduce cooling air from the outer annular plenum 70 into a space between the outer support shell 76 and a cool side of the outer panels 80. The cooling air is then communicated through a plurality of effusion holes in the outer panels 80 to form a cooling air film across a hot side of the outer panels 80 to thermally protect the outer panels 80 from hot combustion gases. Similarly, the inner support shell 78 may include a plurality of impingement holes that introduce cooling air from the inner annular plenum 74 into a space between the inner support shell 78 and a cool side of the inner panels 82. The cooling air is then communicated through a plurality of effusion holes in the inner panels 82 to form a cooling air film across a hot side of the inner panels 82 to thermally protect the inner panels 82 from hot combustion gases.

Figure 1C:
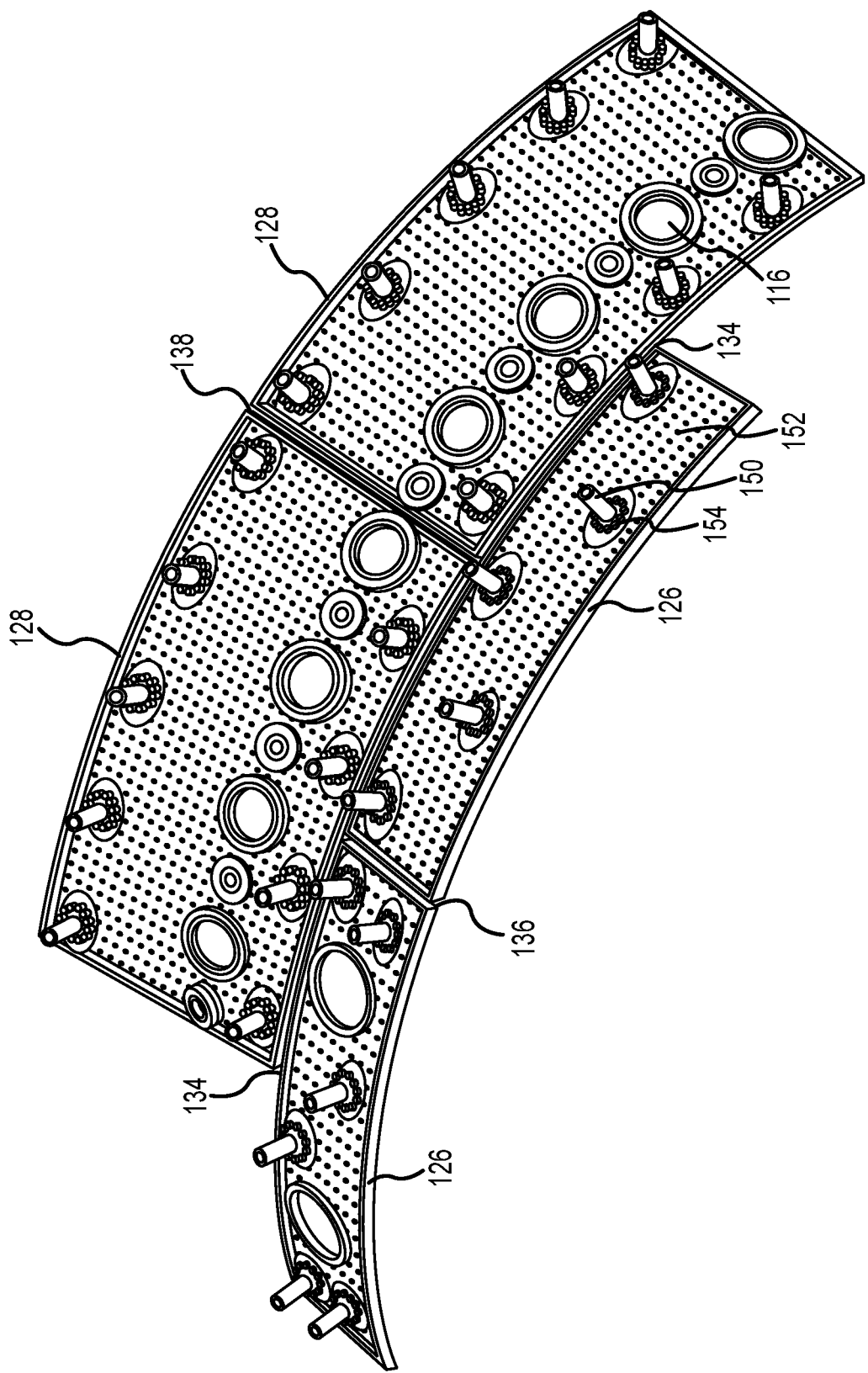
FIG. 1C is a perspective schematic view of a heat shield liner arrangement of a combustor, viewing from the cold side, according to various embodiments.

Turning now to FIG. 1C (with continued reference to FIG. 1B), an illustration of a configuration of circumferentially adjacent first panels 126 and circumferentially adjacent second panels 128 installed within the combustor 56 is shown. The circumferentially adjacent first panels 126 are installed to extend circumferentially about the combustion chamber 66 and form a first axially extending gap 136 between the circumferentially adjacent first panels 126. Similarly, the circumferentially adjacent second panels 128 are installed to extend circumferentially about the combustion chamber 66 and form a second axially extending gap 138 between the circumferentially adjacent second panels 128. A first circumferentially extending gap 134 is also formed between the circumferentially adjacent first panels 126 and the circumferentially adjacent second panels 128 when positioned axially adjacent one another. Similar axially extending and circumferentially extending gaps are formed between similar panels positioned throughout the combustion chamber 66. The first circumferentially extending gap 134, the first axially extending gap 136 and the second axially extending gap 138 accommodate movement or thermal expansion of the circumferentially adjacent first panels 126 and the circumferentially adjacent second panels 128. Also shown in FIG. 1C is the plurality of orifices 116, that may include dilution holes or air feed holes of various dimension, a plurality of effusion holes 152 and a shield attachment mechanism, which includes a stud 150 and a plurality of spacer pins 154.

Figure 2:
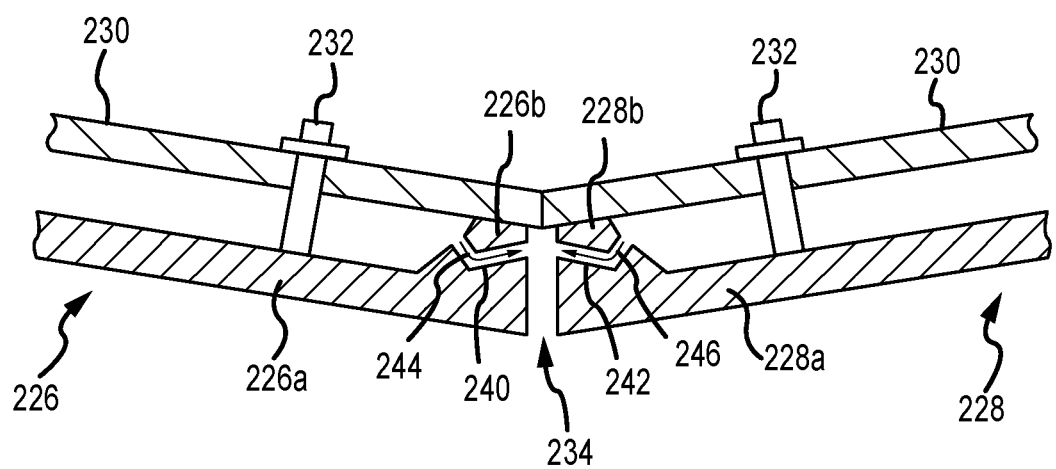
FIG. 2 is a side schematic view of two heat shield liner assemblies positioned adjacent one another and forming a gap between respective panel components of the heat shield liner assemblies, according to various embodiments.

Referring now to FIG. 2, a side view of a circumferentially extending gap 234 formed between a first liner 226 and a second liner 228 positioned adjacent the first liner 226 is shown. The first liner 226 includes a first panel 226a and a first panel rail member 226b extending from the first panel 226a. As installed, the first panel 226a defines a wall of a combustion chamber and the first panel rail member 226b extends outwardly and away from the combustion chamber toward a shell 230 to which the first panel 226a is mounted. An attachment mechanism 232 is configured to mount the first panel 226a to the shell 230. Similarly, the second liner 228 includes a second panel 228a and a second panel rail member 228b extending from the second panel 228a. The second panel 228a defines a wall of a combustion chamber and the second panel rail member 228b extends outwardly and away from the combustion chamber toward the shell 230 to which the second panel 228a is mounted. An attachment mechanism 232 is configured to mount the second panel 228a to the shell 230. The circumferentially extending gap 234 is formed between the first panel 226a and the second panel 228a and the respective orientations of the first panel rail member 226b and the second panel rail member 228b determine the size of the gap 234. It may be desirable, for example, for cooling purposes, to not have the first panel 226a and the second panel 228a in contact with each other.

As illustrated, the first panel rail member 226b and the second panel rail member 228b can be configured substantially perpendicular to the respective first panel 226a and second panel 228a. Impingement cooling within the circumferentially extending gap 234 can be used. The impingement cooling can help relieve heating or oxidation of the first panel 226a and the second panel 228a, or the respective first panel rail member 226b and second panel rail member 228b, in the vicinity of the circumferentially extending gap 234 due to hot combustion gases flowing from the combustion chamber, entraining into the circumferentially extending gap 234, and resulting in burn back oxidation distress. Similar structure to that described above applies to each of the first axially extending gap 136, the second axially extending gap 138 and the first circumferentially extending gap 134 described above with reference to FIG. 1C.

In various embodiments, as described more fully below, the impingement cooling may result from a first impingement orifice 240 extending through the first panel rail member 226b and directed toward the second panel rail member 228b and from a second impingement orifice 242 extending through the second panel rail member 228b and directed toward the first panel rail member 226b. The configuration establishes a first impingement cooling flow 244 directed from the first panel rail member 226b toward the second panel rail member 228b and a second impingement cooling flow 246 directed from the second panel rail member 228b toward the first panel rail member 226b. As described in further detail below, the first impingement orifice 240 and the second impingement orifice 242 are configured such that the flow exiting each orifice impinges against the respective rail member opposite each orifice, with a radially oriented component of flow directed toward the corresponding shell 230.

Figure 3:
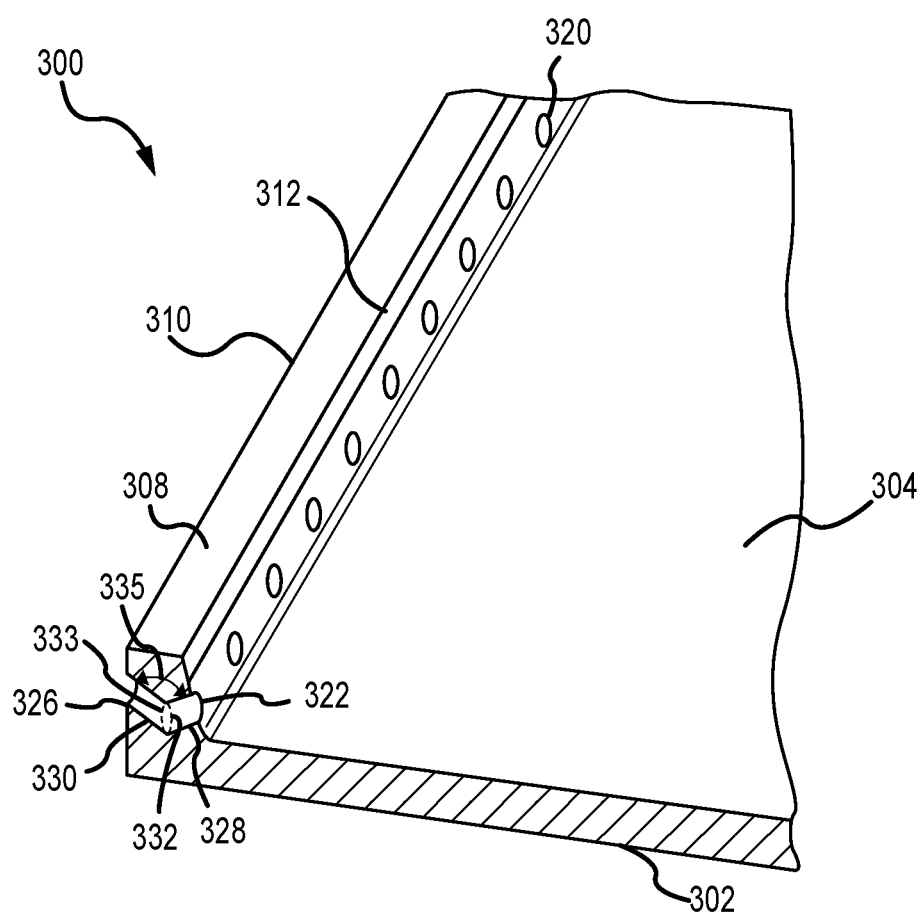
FIG. 3 is a perspective schematic view of a heat shield panel arrangement of a combustor, viewing from the cold side, according to various embodiments.

Referring now to FIG. 3, a schematic view of a heat shield panel 300 is provided, according to various embodiments. The heat shield panel 300 includes a hot side surface 302 and a cold side surface 304, which generally define a base member separated by the two surfaces. The heat shield panel 300 includes an outer perimeter (e.g., rectangular, as illustrated in FIG. 1C) and a rail member 308 disposed on the cold side surface 304 proximate at least a first portion of the outer perimeter. In various embodiments, the rail member 308 extends about the entire outer perimeter (e.g., the four-sided rail member as illustrated in FIG. 1C). The rail member 308 generally includes an outer wall 310 and an inner wall 312. A plurality of impingement orifices 320 extend through the rail member 308 from the outer wall 310 to the inner wall 312. As described above with reference to FIG. 2, the impingement orifices 320 provide a mechanism to cool hot combustion gases residing in gaps (both circumferential gaps and axial gaps) existing between adjacent liners or the panel components of the liners, and thereby also cooling the liners and the panel components thereof.

In various embodiments, each of the impingement orifices 320 includes a first opening 322 positioned on the inner wall 312 and a second opening 326 on the outer wall 310. The first opening 322 (or entrance opening) provides a flow entrance to an entrance portion 328 of each of the impingement orifices 320. In various embodiments, the entrance portion 328 is substantially circular in cross section and slopes in a direction toward the hot side surface 302 from the first opening 322 positioned on the inner wall 312 of the rail member 308. The second opening 326 (or exit opening) provides a flow exit from an exit portion 330 of each of the impingement orifices 320. In various embodiments, the exit portion 330 slopes in a direction toward the hot side surface 302 from the second opening 326 positioned on the outer wall 310 of the rail member 308. In various embodiments, the entrance portion 328 and the exit portion 330 intersect at or proximate an intermediate portion 332, located intermediate the outer wall 310 and the inner wall 312. In various embodiments, the entrance portion 328 and the exit portion 330 are angled relative to each other—e.g., the entrance portion 328 and the exit portion 330 do not have a common central axis extending there through. In various embodiments, the entrance portion 328 and the exit portion 330 are oriented at an obtuse angle 335 relative to each other.

In various embodiments, the intermediate portion 332 may be defined by a cross sectional plane 333 formed by the intersection of the entrance portion 328 and the exit portion 330. In various embodiments, the cross sectional plane 333 has an oval shape, such as can occur at the intersection of two circular shaped tubes. In various embodiments, the cross sectional plane 333 is located within the rail member 308 such that at least a portion of the cross sectional plane 333 is disposed closer in distance to the hot side surface 302 than both the first opening 322 and the second opening 326, thereby providing a multi-direction hole or orifice having a V-shape in cross section when viewed in a lengthwise direction along the rail member 308. In various embodiments, the cross sectional plane 333 has a location within the rail member 308 such that at least a portion of the cross sectional plane 333 is disposed closer in distance to the hot side surface 302 than the second opening 326, while the cross sectional plane 333 of the intermediate portion 332 and the first opening 322 are positioned substantially the same distance to the hot side surface 302. In various embodiments, the first opening 322 of each of the impingement orifices 320 may include a portion in contact with or tangent to the cold side surface 304, such that cooling fluid may flow smoothly across the cold side surface 304 and into the impingement orifices 320 with minimal obstruction. While the intermediate portion 332 has been described above as having a cross sectional plane 333 in the shape of an oval, the disclosure contemplates any cross sectional shape be employed, such as, for example, circular, square and polygonal cross sectional shapes. Further, the disclosure contemplates a smooth transition from the entrance portion 328 and the exit portion 330 at the intermediate portion 332, such that no discontinuities in the resulting orifice are present.

Figure 4A:
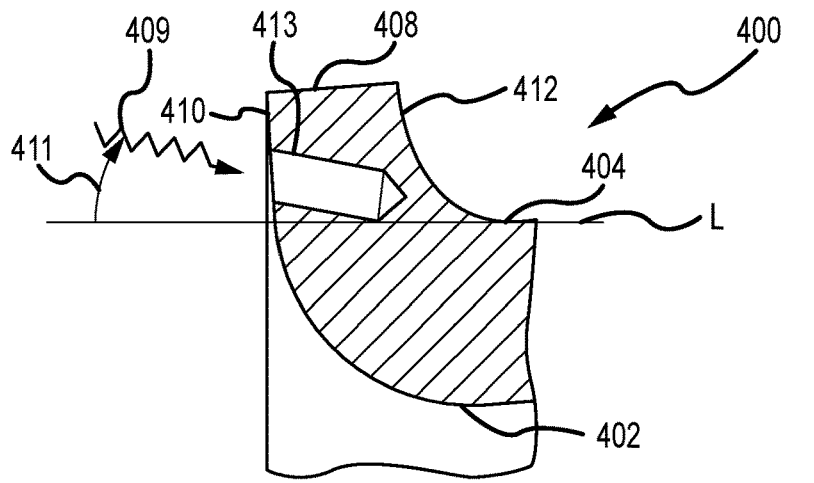
FIGS. 4A, 4B and 4C are schematic views illustrating steps used to form orifices in a panel similar to those illustrated in FIG. 3, according to various embodiments.
Figure 4B:
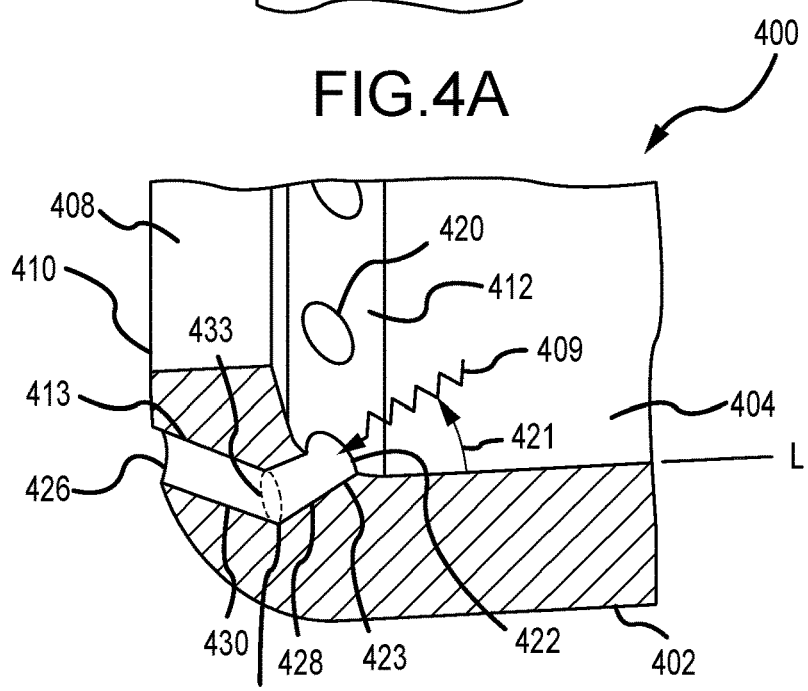
Figure 4C:
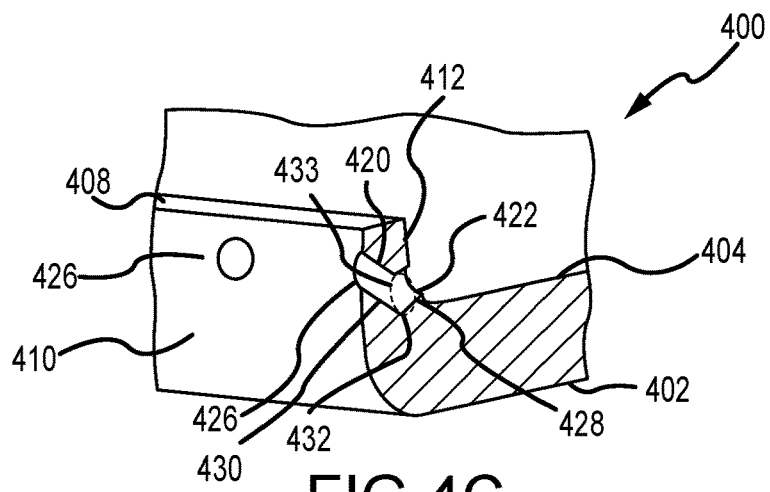

Referring now to FIGS. 4A-4C, a method of forming an impingement orifice 420 through a rail member 408 of a heat shield panel 400, similar to the impingement orifices 320 described above with reference to FIG. 3, is described. Referring to FIG. 4A, for example, a portion of the rail member 408 is shown positioned relative to a hole boring tool 409, such as a conventional drill, an electrical discharge machining electrode, a waterjet or a laser drill. The hole boring tool 409 is positioned at a first predetermined angle 411 with respect to the rail member 408. In various embodiments, the first predetermined angle 411 may be measured with reference to a line L oriented tangent to a portion of a cold side surface 404 of the heat shield panel 400. A first hole 413 is then formed in the rail member 408 using the hole boring tool 409. In various embodiments, the first hole 413 extends at least partially through the rail member 408, starting from the outer wall 410 and angled toward the inner wall 412 and a hot side surface 402, but not penetrating through the inner wall 412 or the hot side surface 402.

Referring now to FIG. 4B, the hole boring tool 409 is extracted (for a hole boring tool 409 that enters the first hole 413) and turned off (for any hole boring tool 409) and then repositioned to a second predetermined angle 421 with respect to the rail member 408. In various embodiments, the second predetermined angle 421 may be measured with reference to the same line L oriented tangent to a portion of the cold side surface 404 of the heat shield panel 400. A second hole 423 is then formed in the rail member 408 using the hole boring tool 409. In various embodiments, the second hole 423 extends at least partially through the rail member 408, starting from the inner wall 412 and angled toward the outer wall 410 and the hot side surface 402, but not penetrating through the outer wall 410 or the hot side surface 402. The second hole 423 extends far enough into the rail member 408 to intersect the first hole 413, thereby forming the impingement orifice 420. The hole boring tool 409 is then extracted (for a hole boring tool 409 that enters the second hole 423) and turned off (for any hole boring tool 409).

Referring now to FIGS. 4B and 4C, in various embodiments, following the first hole 413 and the second hole 423, the impingement orifice 420 includes a first opening 422 positioned on the inner wall 412 and a second opening 426 on the outer wall 410. The first opening 422 provides a flow entrance to an entrance portion 428 of the impingement orifice 420. In various embodiments, the entrance portion 428 is substantially circular in cross section and slopes in a direction toward the hot side surface 402 from the first opening 422 positioned on the inner wall 412 of the rail member 408. The second opening 426 provides a flow exit from an exit portion 430 of the impingement orifice 420. In various embodiments, the exit portion 430 slopes in a direction toward the hot side surface 402 from the second opening 426 positioned on the outer wall 410 of the rail member 408. In various embodiments, the entrance portion 428 and the exit portion 430 intersect at an intermediate portion 432, located intermediate the outer wall 410 and the inner wall 412.

In various embodiments, the intermediate portion 432 may be defined by a cross sectional plane 433, having a location within the rail member 408 such that at least a portion of the cross sectional plane 433 is disposed closer in distance to the hot side surface 402 than both the first opening 422 and the second opening 426, thereby providing a multi-direction hole or orifice having a V-shape in cross section when viewed in a lengthwise direction along the rail member 408. In various embodiments, the cross sectional plane 433 has a location within the rail member 408 such that at least a portion of the cross sectional plane 433 is disposed closer in distance to the hot side surface 402 than the second opening 426, while the cross sectional plane 433 of the intermediate portion 432 and the first opening 422 are positioned substantially the same distance to the hot side surface 402. In various embodiments, the first opening 422 of the impingement orifice 420 may include a portion in contact with or tangent to the cold side surface 404, such that cooling fluid may flow smoothly across the cold side surface 404 and into the impingement orifice 420 with minimal obstruction.

Figure 5A:
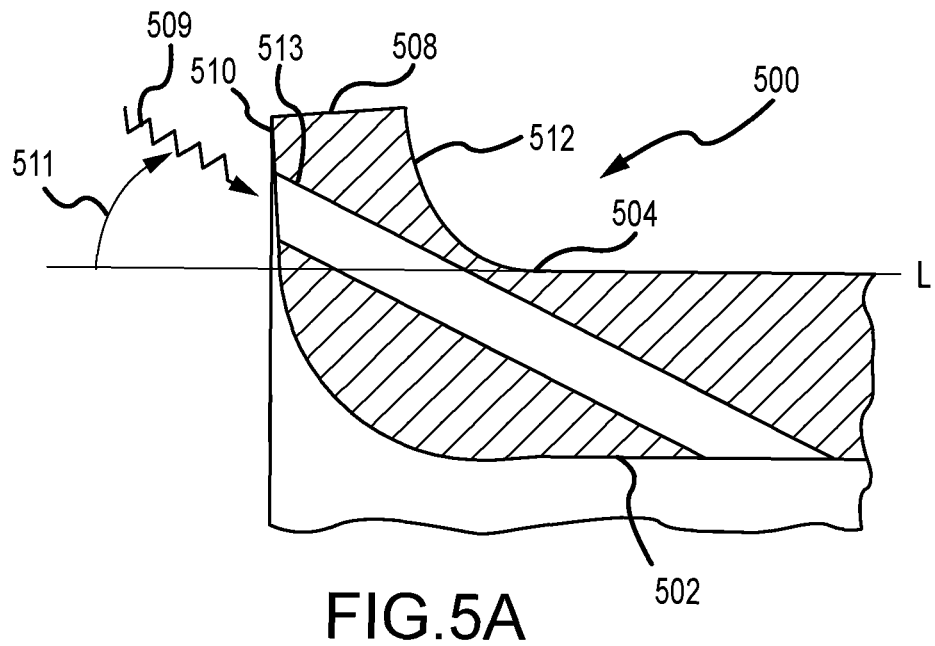
FIGS. 5A-5E are schematic views illustrating steps used to form orifices in panels, according to various embodiments.

Referring now to FIGS. 5A-5E, a method of forming an impingement orifice 520 through a rail member 508 of a heat shield panel 500, similar to the impingement orifices 320 and the impingement orifice 420, described above with reference to FIGS. 3 and 4C, respectively, is described. Referring to FIG. 5A, for example, a portion of the rail member 508 is shown positioned relative to a hole boring tool 509, such as a conventional drill, an electrical discharge machining electrode, a waterjet or a laser drill. The hole boring tool 509 is positioned at a first predetermined angle 511 with respect to the rail member 508. In various embodiments, the first predetermined angle 511 may be measured with reference to a line L oriented tangent to a portion of a cold side surface 504 of the heat shield panel 500. A first hole 513 is then formed in the rail member 508 using the hole boring tool 509. In various embodiments, the first hole 513 extends through the rail member 508, starting from an outer wall 510 and angled toward an inner wall 512 and a hot side surface 502 of the heat shield panel 500, and penetrating through the hot side surface 502.

Figure 5B:
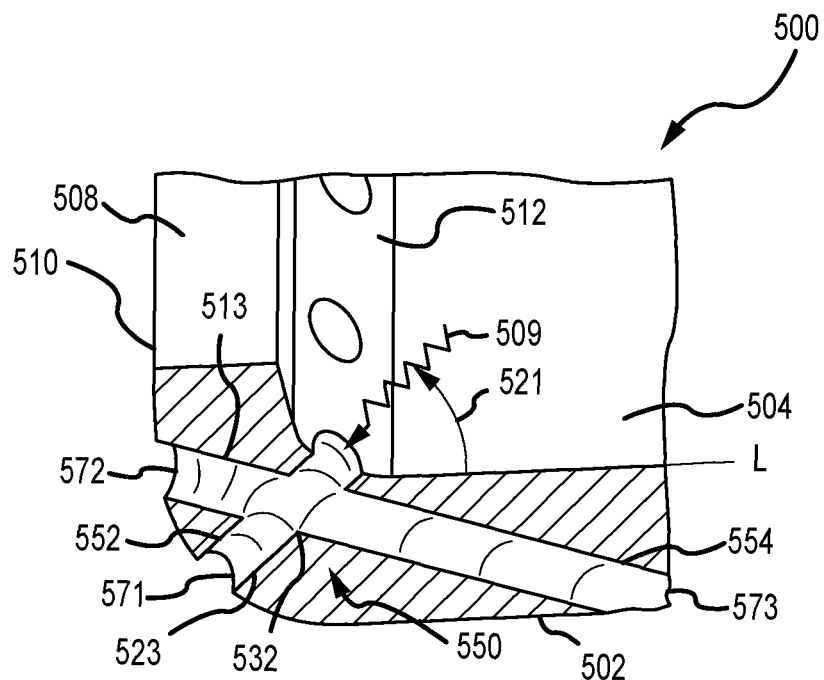

Referring now to FIG. 5B, the hole boring tool 509 is repositioned to a second predetermined angle 521 with respect to the rail member 508. In various embodiments, the second predetermined angle 521 may be measured with reference to the same line L oriented tangent to a portion of the cold side surface 504 of the heat shield panel 500. A second hole 523 is then formed in the rail member 508 using the hole boring tool 509. In various embodiments, the second hole 523 extends through the rail member 508, starting from the inner wall 512 and angled toward the outer wall 510 and the hot side surface 502, penetrating through the hot side surface 502. In various embodiments, the second hole 523 penetrates through both the hot side surface 502 and a an underside portion of the rail member 508, as is illustrated in FIG. 5B. The second hole 523 intersects the first hole 513, thereby forming a pair of cross intersecting holes 550. The pair of cross intersecting holes 550 intersect at an intermediate portion 532, located intermediate the outer wall 510 and the inner wall 512. In various embodiments, the first hole 513 may be referred to as a first intersecting hole, while the second hole 523 may be referred to as a second intersecting hole. In various embodiments, the steps of forming the first hole 513 and the second hole 523 may be reversed. In various embodiments, the direction of forming (e.g., drilling) the first hole 513 and the second hole 523 may proceed from the hot side surface 502 toward the cold side surface 504 or from the hot side surface 502 toward the inner wall 512 or the outer wall 510, depending on which hole is being formed. In various embodiments, the hole boring tool 509 is positioned with respect to the heat shield panel 500 or the heat shield panel 500 is positioned with respect to the hole boring tool 509. In various embodiments, following forming the first hole 513 and the second hole 523, the pair of cross intersecting holes 550 includes a first extended hole portion 552 and a second extended hole portion 554. In various embodiments, the first extended hole portion 552 defines a first exit opening 571, the first hole 513 defines a second exit opening 572 and the second extended hole portion 554 defines a third exit opening 573. In the disclosure that follows, the first exit opening 571 and the third exit opening 573 may be plugged or backfilled to form the impingement orifice 520. In various embodiments, one or more of the first exit opening 571, the second exit opening 572 and the third exit opening 573 may be plugged or backfilled to form variations of the impingement orifice 520, including orifices that provide either or both of impingement and effusion cooling.

Figure 5C:
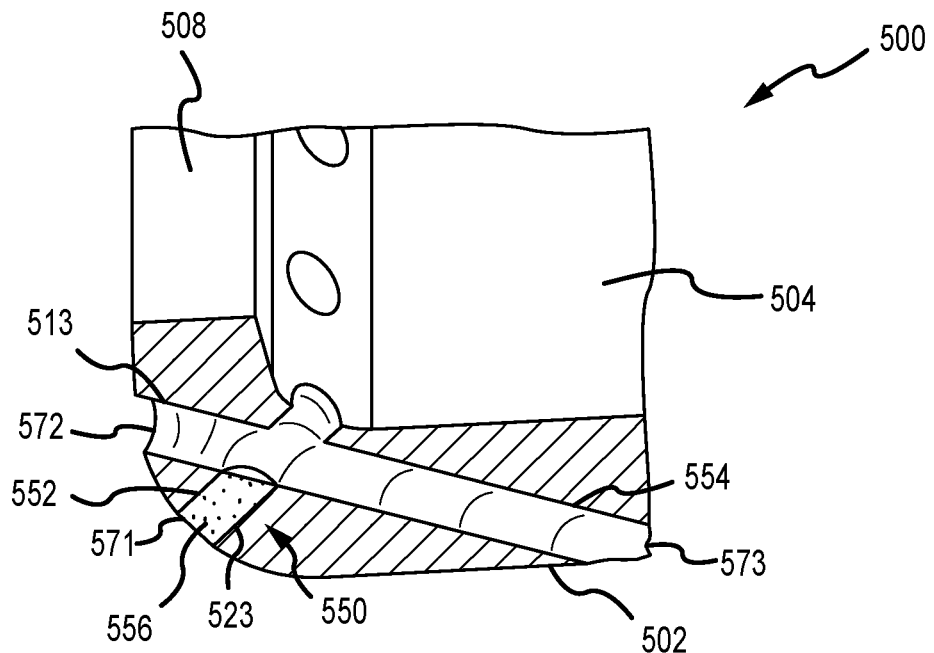

In order to form the impingement orifice 520, according to various embodiments, the first extended hole portion 552 and the second extended hole portion 554 are backfilled or plugged with a suitable material. Referring to FIG. 5C, for example, the first extended hole portion 552 is backfilled with a first plug 556. In various embodiments, the first plug 556 comprises a suitable material, such as a solder compound comprising an alloy of copper and zinc, thereby forming a first brazed seal or plug that blocks cooling fluid from flowing through the first extended hole portion 552. In various embodiments, the first plug 556 extends inward from the first exit opening 571 to a region where the first brazed seal or plug intersects with an outer boundary or wall of the first hole 513. Following backfilling of the first extended hole portion 552, the ends of the first plug 556 may be smoothed or contoured as may be beneficial using any suitable technique. For example, the end of the first plug 556 that intersects with the first hole 513 maybe contoured with a high-speed twist drill or with the hole boring tool 509 to provide a smooth contour of the impingement orifice 520 that results from the above described steps. In various embodiments, a suitable welding material and technique may be used in conjunction or combination with or as an alternate to the braze material and technique or plug described above.

Figure 5D:
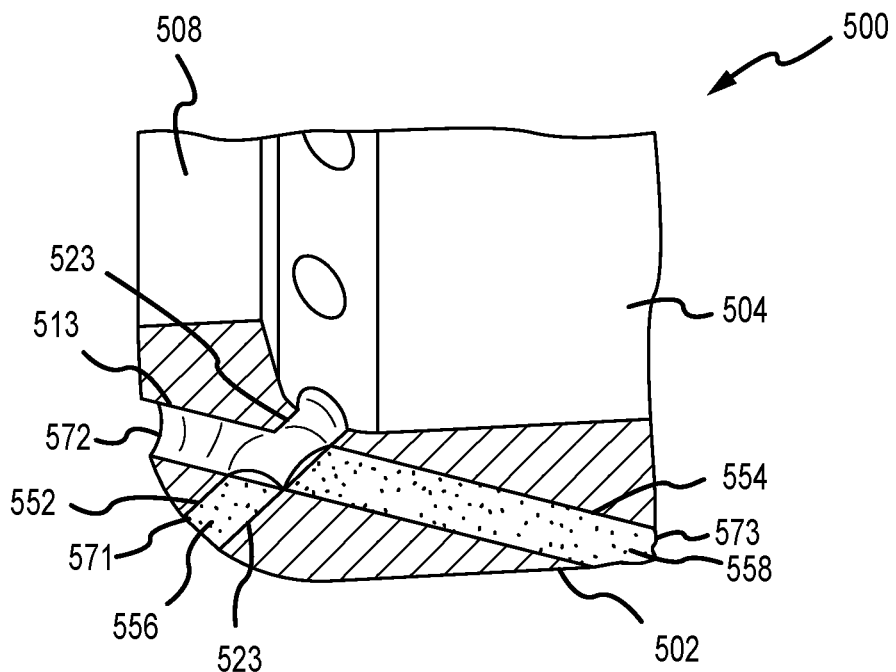

Referring to FIG. 5D, the second extended hole portion 554 is similarly backfilled with a second plug 558. In various embodiments, the second plug 558 comprises a suitable material, such as a solder compound comprising an alloy of copper and zinc, thereby forming a second brazed seal or plug that blocks cooling fluid from flowing through the second extended hole portion 554. In various embodiments, the second plug 558 extends inward from the third exit opening 573 to a region where the second brazed seal or plug intersects with an outer boundary or wall of the second hole 523. Following backfilling of the second extended hole portion 554, the ends of the second plug 558 may be smoothed or contoured as may be beneficial using any suitable technique. For example, the end of the second plug 558 that intersects with the second hole 523 maybe contoured with a high-speed twist drill or with the hole boring tool 509 to provide a smooth contour of the impingement orifice 520 that results from the above described steps. In various embodiments, a suitable welding material and technique may be used in conjunction or combination with or as an alternate to the braze material and technique or plug described above.

Figure 5E:
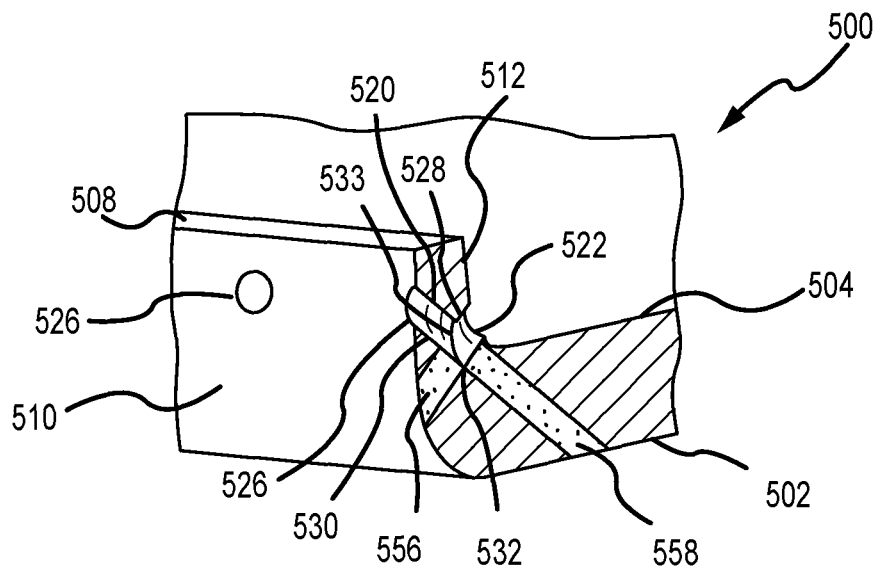

Referring now to FIG. 5E, a schematic illustration of the impingement orifice 520 formed using the above steps is illustrated. Similar to the impingement orifices 320 described with reference to FIG. 3 and the impingement orifice 420 described with reference to FIG. 4, the impingement orifice 520 includes a first opening 522 positioned on the inner wall 512 and a second opening 526 (or second exit opening 572) positioned on the outer wall 510. The first opening 522 provides a flow entrance to an entrance portion 528 of the impingement orifice 520. In various embodiments, the entrance portion 528 is substantially circular in cross section and slopes in a direction toward the hot side surface 502 from the first opening 522 positioned on the inner wall 512 of the rail member 508. The second opening 526 (or second exit opening 572) provides a flow exit from an exit portion 530 of the impingement orifice 520. In various embodiments, the exit portion 530 slopes in a direction toward the hot side surface 502 from the second opening 526 positioned on the outer wall 510 of the rail member 508. In various embodiments, the entrance portion 528 and the exit portion 530 intersect at an intermediate portion 532, located intermediate the outer wall 510 and the inner wall 512.

In various embodiments, the intermediate portion 532 may be defined by a cross sectional plane 533, having a location within the rail member 508 such that at least a portion of the cross sectional plane 533 is disposed closer in distance to the hot side surface 502 than both the first opening 522 and the second opening 526, thereby providing a multi-direction hole or orifice having a V-shape in cross section when viewed in a lengthwise direction along the rail member 508. In various embodiments, the cross sectional plane 533 has a location within the rail member 508 such that at least a portion of the cross sectional plane 533 is disposed closer in distance to the hot side surface 502 than the second opening 526, while the cross sectional plane 533 of the intermediate portion 532 and the first opening 522 are positioned substantially the same distance to the hot side surface 502. In various embodiments, the first opening 522 of the impingement orifice 520 may include a portion in contact with or tangent to the cold side surface 504, such that cooling fluid may flow smoothly across the cold side surface 504 and into the impingement orifice 520 with minimal obstruction.

Figure 6:
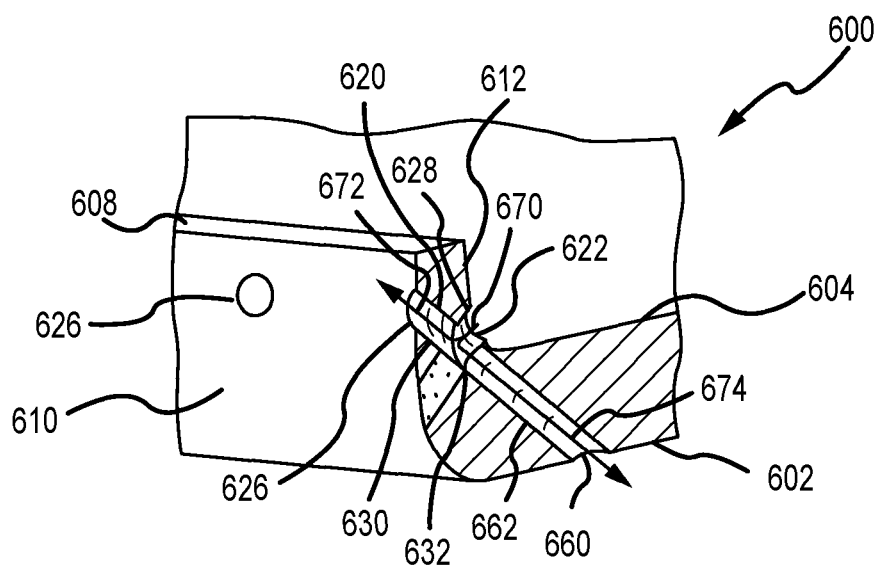
FIG. 6 is a schematic view illustrating a dual-exit orifice, according to various embodiments.

Referring now to FIG. 6, a schematic illustration of a heat shield panel 600 having a dual-exit cooling orifice 620 extending through a rail member 608, formed using the steps described above with reference to FIGS. 5A-5C, is provided. The dual-exit cooling orifice 620 is configured to provide both an impinging flow of fluid toward a rail member of an adjacent heat shield panel and an effusing flow of fluid to a hot side surface 602 of the heat shield panel 600. The dual-exit cooling orifice 620 includes a first opening 622 positioned on an inner wall 612, a second opening 626 positioned on an outer wall 610 and a third opening 660 positioned on the hot side surface 602. The first opening 622 provides a flow entrance to an entrance portion 628 of the dual-exit cooling orifice 620. In various embodiments, the entrance portion 628 is substantially circular in cross section and slopes in a direction toward the hot side surface 602 from the first opening 622 positioned on the inner wall 612 of the rail member 608. The second opening 626 provides a first flow exit from an outer wall exit portion 630 of the dual-exit cooling orifice 620. In various embodiments, the outer wall exit portion 630 slopes in a direction toward the hot side surface 602 from the second opening 626 positioned on the outer wall 610 of the rail member 608. The third opening 660 provides a second flow exit from a hot side exit portion 662 of the dual-exit cooling orifice 620. In various embodiments, the hot side exit portion 662 of the dual-exit cooling orifice 620 is an extension of the outer wall exit portion 630, both the hot side exit portion 662 and the outer wall exit portion 630 being formed by the first hole 513, described above with reference to FIG. 5A.

In various embodiments, the entrance portion 628 and the outer wall exit portion 630 of the dual-exit cooling orifice 620 intersect at an intermediate portion 632, located intermediate the outer wall 610 and the inner wall 612 and share structural and positional characteristics similar to those described above concerning the entrance portion 528 and the exit portion 530 referred to in FIGS. 5A-5E and the entrance portion 428 and the exit portion 430 referred to in FIGS. 4A-4C. Addition of the hot side exit portion 662, however, provides for the dual-exit feature described above, wherein a flow of cooling fluid 670 enters the entrance portion 628 and splits into an impingement cooling flow 672 directed to an adjacent panel or rail member and an effusion cooling flow 674 directed to the hot side surface 602 of the heat shield panel 600.

Figure 7:
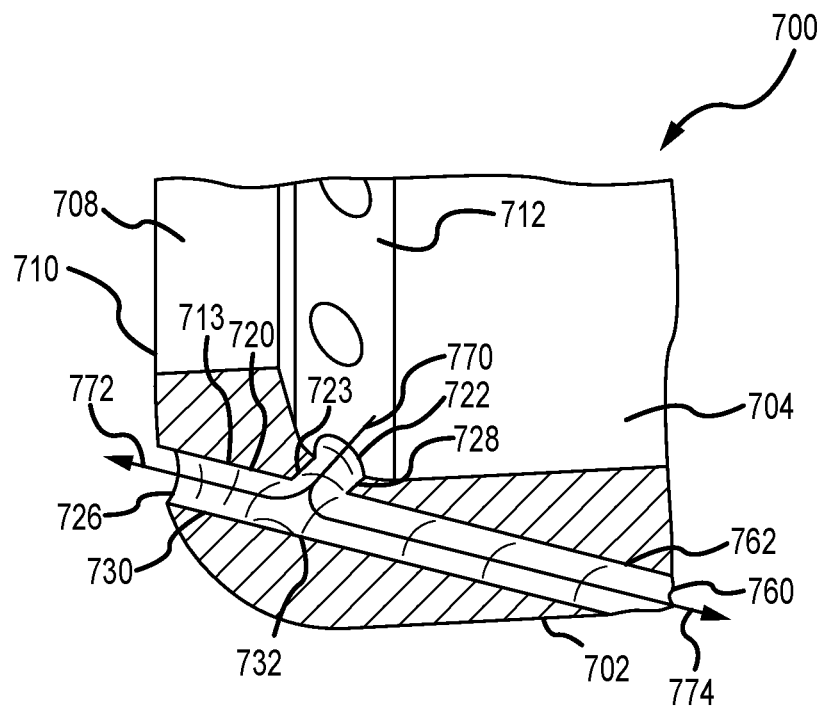
FIG. 7 is a schematic view illustrating a dual-exit orifice, according to various embodiments.
Figure 8:
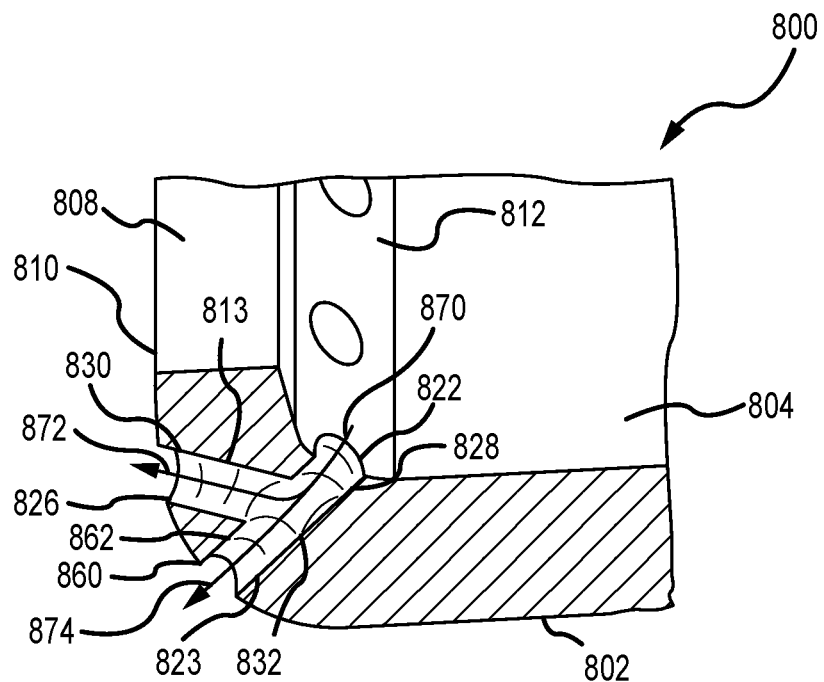
FIG. 8 is a schematic view illustrating a dual-exit orifice, according to various embodiments.

Referring now to FIGS. 7 and 8, alternatives to one or more of the foregoing embodiments is disclosed. Referring to FIG. 7, for example, a heat shield panel 700 having a dual-exit cooling orifice 720 extending through a rail member 708 is disclosed, according to various embodiments. The dual-exit cooling orifice 720 is configured to provide both an impinging flow of fluid toward a rail member of an adjacent heat shield panel and an effusing flow of fluid to a hot side surface 702 of the heat shield panel 700. The dual-exit cooling orifice 720 includes a first opening 722 positioned on an inner wall 712, a second opening 726 positioned on an outer wall 710 and a third opening 760 positioned on the hot side surface 702. The first opening 722 provides a flow entrance to an entrance portion 728 of the dual-exit cooling orifice 720. In various embodiments, the entrance portion 728 is substantially circular in cross section and slopes in a direction toward the hot side surface 702 from the first opening 722 positioned on the inner wall 712 of the rail member 708. The second opening 726 provides a first flow exit from an outer wall exit portion 730 of the dual-exit cooling orifice 720. In various embodiments, the outer wall exit portion 730 slopes in a direction toward the hot side surface 702 from the second opening 726 positioned on the outer wall 710 of the rail member 708. The third opening 760 provides a second flow exit from a hot side exit portion 762 of the dual-exit cooling orifice 720. In various embodiments, the hot side exit portion 762 is an extension of the outer wall exit portion 730, both the hot side exit portion 762 and the outer wall exit portion 730 being formed by a first hole 713, similar to the first hole 513, described above with reference to FIG. 5A. In various embodiments, the entrance portion 728 is formed by a second hole 723 that extends only partially into the rail member 708 from the inner wall 712, similar to the second hole 423, described above with respect to FIG. 4B.

In various embodiments, the entrance portion 728 and the outer wall exit portion 730 of the dual-exit cooling orifice 720 intersect at an intermediate portion 732, located intermediate the outer wall 710 and the inner wall 712 and share structural and positional characteristics similar to those described above concerning the entrance portion 528 and the exit portion 530 referred to in FIGS. 5A-5E and the entrance portion 428 and the exit portion 430 referred to in FIGS. 4A-4C. Addition of the hot side exit portion 762, however, provides for the dual-exit feature described above, wherein a flow of cooling fluid 770 enters the entrance portion 728 and splits into an impingement cooling flow 772 directed to an adjacent panel or rail member and an effusion cooling flow 774 directed to the hot side surface 702 of the heat shield panel 700.

Referring now to FIG. 8, a heat shield panel 800 having a dual-exit cooling orifice 820 extending through a rail member 808 is disclosed, according to various embodiments. The dual-exit cooling orifice 820 is configured to provide both an impinging flow of fluid toward a rail member of an adjacent heat shield panel and a second impinging flow or an effusing flow of fluid to a hot side surface 802 of the heat shield panel 800. The dual-exit cooling orifice 820 includes a first opening 822 positioned on an inner wall 812, a second opening 826 positioned on an outer wall 810 and a third opening 860 positioned proximate the intersection of the outer wall 810 and the hot side surface 802. The first opening 822 provides a flow entrance to an entrance portion 828 of the dual-exit cooling orifice 820. In various embodiments, the entrance portion 828 is substantially circular in cross section and slopes in a direction toward the hot side surface 802 from the first opening 822 positioned on the inner wall 812 of the rail member 808. The second opening 826 provides a first flow exit from an outer wall exit portion 830 of the dual-exit cooling orifice 820. In various embodiments, the outer wall exit portion 830 slopes in a direction toward the hot side surface 802 from the second opening 826 positioned on the outer wall 810 of the rail member 808. The third opening 860 provides a second flow exit from a hot side exit portion 862 of the dual-exit cooling orifice 820. In various embodiments, the hot side exit portion 862 is an extension of the entrance portion 828, both the hot side exit portion 862 and the entrance portion 828 being formed by a second hole 823, similar to the second hole 523, described above with reference to FIG. 5B. In various embodiments, the outer wall exit portion 830 is formed by a first hole 813 that extends only partially into the rail member 808 from the outer wall 810, similar to the first hole 413, described above with respect to FIG. 4A.

In various embodiments, the entrance portion 828 and the outer wall exit portion 830 of the dual-exit cooling orifice 820 intersect at an intermediate portion 832, located intermediate the outer wall 810 and the inner wall 812 and share structural and positional characteristics similar to those described above concerning the entrance portion 528 and the exit portion 530 referred to in FIGS. 5A-5E and the entrance portion 428 and the exit portion 430 referred to in FIGS. 4A-4C. Addition of the hot side exit portion 862, however, provides for the dual-exit feature described above, wherein a flow of cooling fluid 870 enters the entrance portion 828 and splits into an impingement cooling flow 872 directed to an adjacent panel or rail member and a second impingement flow or an effusion cooling flow 874 directed to the hot side surface 802 of the heat shield panel 800.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A heat shield panel for use in a gas turbine engine combustor, comprising:
    a hot side;
    a cold side spaced from the hot side;
    a rail member disposed on the cold side proximate an outer perimeter of the heat shield panel, the rail member having an outer wall and an inner wall; and
    an orifice extending through the rail member, from the inner wall to the outer wall, the orifice having
        an entrance portion having an entrance opening positioned on the inner wall and extending, in a first sloping direction toward the hot side, at least to an intermediate portion of the rail member, and
        an exit portion having an exit opening positioned on the outer wall and extending, in a second sloping direction toward the hot side, at least to the intermediate portion of the rail member;
    wherein the entrance portion of the orifice is angled relative to the exit portion of the orifice, thereby providing a multi-direction orifice having a V-shape in cross section when viewed in a lengthwise direction along the rail member and
    wherein the entrance portion of the orifice is configured to receive an impingement cooling flow and the exit portion is configured to exhaust the impingement cooling flow.

2. The heat shield panel of claim 1, wherein the entrance portion and the exit portion intersect at a cross sectional plane located proximate the intermediate portion.

3. The heat shield panel of claim 2, wherein the exit opening is positioned to direct the impingement cooling flow through the orifice toward an engine component positioned adjacent the rail member.

4. The heat shield panel of claim 3, wherein the engine component is a second heat shield panel positioned adjacent the rail member.

5. The heat shield panel of claim 2, wherein the cross sectional plane includes at least a portion disposed closer in distance to the hot side than both the entrance opening and the exit opening.

6. The heat shield panel of claim 2, wherein the cross sectional plane includes at least a portion disposed closer in distance to the hot side than the exit opening and wherein the cross sectional plane and the entrance opening are positioned substantially the same distance from the hot side.

7. The heat shield panel of claim 2, wherein the entrance portion and the exit portion include substantially circular cross sections and wherein the cross sectional plane is substantially oval in cross section.

8. The heat shield panel of claim 2, wherein the outer perimeter has a rectangular shape and the cold side and the hot side have an arcuate shape.

9. The heat shield panel of claim 8, wherein the rail member extends entirely about the rectangular shape of the outer perimeter.

* * * * *